United States Patent Office 3,130,120
Patented Apr. 21, 1964

3,130,120
EPOXYHALOALKANES AS STABILIZERS FOR HALOGENATED VINYL PHOSPHATE INSECTICIDES
Dave R. Schultz, Union, and Leo F. Sekula, Paterson, N.J., assignors to Shell Oil Company, New York, N.Y., a corporation of Delaware
No Drawing. Filed Aug. 22, 1961, Ser. No. 133,055
8 Claims. (Cl. 167—22)

This invention relates to stabilized pesticidal compositions and to methods for preparing them.

The vinyl phosphates, such as dimethyl 2-carbomethoxy-1-methylvinyl phosphate and dimethyl 2,2-dichlorovinyl phosphate, and their halogen addition products, the 1,2-dihaloethyl phosphates, such as 1,2-dibromo-2,2-dichloroethyl dimethyl phosphate, and the corresponding phosphonates and phosphinates, constitute two general classes of highly effective insecticides. Certain of the dihaloethyl compounds also are effective soil fungicides. However, as is the case with most organophosphorus insecticides, these insecticides and fungicides tend to be unstable in the presence of water. Consequently, when it is desired to prepare sprayable liquid compositions containing water, as well as one or more of these insecticides and fungicides, it is necessary to take special precautions to avoid decomposition and consequent loss of the insecticides.

It is common practice in cases such as is here encountered to prepare organophosphorus pesticides as emulsible concentrates—i.e., to formulate the pesticides in essentially anhydrous liquid compositions in which the pesticides are stable, those compositions being readily dispersible in water. Generally a liquid hydrocarbon is used as the solvent; a high concentration—normally from about 10 percent to 70 percent by weight—of the pesticide is present, and a minor amount—usually from about 1 percent to 10 percent by weight—of a surface-active agent is added to cause this concentrated hydrocarbon solution of the pesticide to readily disperse in water. The concentrate is added to and emulsified in water just before the spraying is done.

It has been found that when one attempts to prepare such an emulsible concentrate of a pesticide of this invention, i.e., a vinyl phosphate insecticide, an insecticidal or fungicidal halogen addition product thereof or one or more of the insecticidal or fungicidal corresponding phosphonates or phosphinates, the pesticide tends to be unstable. The instability apparently results from interaction of the pesticide and the surface-active agent, for it has been found that the degree of pesticide instability varies greatly with variation in the kind of surface-active agent that is used. Because of this instability, the potential utility and value of these pesticides has been seriously curtailed. The emulsible concentrates have limited shelf-life, and are not saleable after more than a few months because their toxic content falls below the level guaranteed on the label. Consequently, unused or unsold stocks must be replaced frequently with freshly prepared material. Since in many, if not most cases, it is impracticable to reclaim or fortify the old stocks, the instability of the pesticides in these formulations seriously increases their loss, and decreases their value.

It has now been found that the instability of these pesticides in emulsible concentrates can be markedly reduced if a non-ionic surface-active agent is employed as the emulsifier, rather than an ionic surface-active agent, such as the anionic surface-active agents commonly and usually employed by the art as emulsifiers. In fact, by proper choice of the nonionic surface-active agent, the instability of the pesticide in some cases can be reduced to a point that the shelf-life of the resulting composition will be acceptably long.

The emulsible concentrates of these pesticides preferably are essentially anhydrous, for even small amounts of water tend to cause the pesticides to decompose—the effect of water seems to be greatly out of proportion to the amount of water that is present. Exclusion of water from emulsible concentrates can present a very difficult problem, because many of the available surface-active agents contain some water, which is very difficult to remove.

It has been further found that the stability of emulsible concentrates of the vinyl phosphate and related pesticides is improved by the addition of a minor amount of a lower epoxyhaloalkane, such as epichlorohydrin. The stabilizing effect of this kind of material is exerted regardless of the kind of surface-active agent used, and regardless of whether a minor amount of water is present. The inclusion of a minor amount of the lower epoxyhaloalkane so improves the stability of the formulation that its shelf-life is acceptable even when an ionic surface-active agent is used and/or when a small amount of water is present. Where a nonionic surface-active agent is used, the shelf-life of the resulting formulations is excellent.

Accordingly, one aspect of this invention comprises the use of a nonionic surface-active agent in the preparation of an emulsible concentrate comprising a vinyl phosphate or related insecticide or fungicide as defined herein, an inert horticultural solvent and a surface-active agent, and the resulting stabilized compositions. Another aspect of this invention comprises the use of a lower epoxy-haloalkane in the preparation of an emulsible concentrate comprising a vinyl phosphate or related insecticide or fungicide as defined herein, an inert horicultural solvent and a surface-active agent, and the resulting compositions. Still another, and a preferred, aspect of this invention comprises the use of a nonionic surface-active agent and a lower epoxyhaloalkane in the preparation of an emulsible concentrate comprising a vinyl phosphate or related insecticide or fungicide as defined herein, an inert horticultural solvent and a surface-active agent, and the resulting compositions.

The vinyl insecticides contemplated by this invention have the formula:

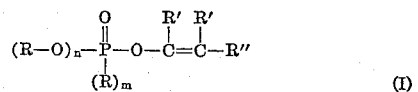

$$(R-O)_n-\underset{(R)_m}{\overset{\overset{O}{\|}}{P}}-O-\underset{}{\overset{R'}{\underset{|}{C}}}=\overset{R'}{\underset{|}{C}}-R'' \qquad (I)$$

wherein R represents hydrocarbon or substituted hydrocarbon, R' represents hydrogen, halogen or one of the groups represented by R, and R" represents halogen, one of the groups represented by R or a functional organic group, n is 0, 1 or 2, and m+n=2, with the proviso that when n=2, both of the symbols, R, together can represent a divalent organic group, each of R representing one valence bond of that group.

In these insecticides, it is preferred that when any of R' and R" represents halogen, the halogen be middle halogen—that is, bromine or chlorine.

These compounds are well known in the art, various classes thereof being described in such United States Patents as U.S. 2,744,128; 2,788,358; 2,865,944; 2,867,646; 2,891,887; 2,894,014; 2,894,018; 2,895,982; 2,898,341; 2,913,367 and 2,956,073, and in such British patents as No. 783,697.

As indicated in these patents, the organic groups represented by the symbols, R and R', preferably are low molecular weight hydrocarbon or substituted hydrocarbon groups, for example, containing from one to ten carbon atoms each. They may be aliphatic, cycloaliphatic, aromatic or of mixed structure. When aliphatic, they may be either straight-chain or branched-chain in configuration. Typewise, the preferred organic groups include alkyl, cycloalkyl, aryl, alkaryl, and like groups. Illustrative examples include the methyl, ethyl, n- and isopropyl groups, the various isomeric butyl, hexyl and like alkyl groups; the cyclopentyl, cyclohexyl and like cycloalkyl groups, the phenyl group; the naphthyl group; the benzyl, phenethyl, p-methylbenzyl and like aralkyl groups; the isomeric tolyl groups, the isomeric xylyl groups, the ethylphenyl group, the 2,4-dimethyl- and 3,5-dimethylphenyl and like alkaryl groups, and the like.

Where $n$ is 2—that is, in the phosphate insecticides—the two symbols, R, may together represent a divalent hydrocarbon group, each of the symbols representing one valence bond thereof. In such insecticides, it is preferred that the divalent group be an alkylene group of up to 10 carbon atoms, with 1 to 5—preferably 2 to 3—carbon atoms in the chain thereof which bonds together the indicated oxygen atoms.

Further, the symbols, R, together may represent such a divalent hydrocarbon group.

The substituted hydrocarbon groups represented by R and R' are those of the above-mentioned hydrocarbon groups which are substituted by one or more non-hydrocarbon substituents. The preferred substituents are middle halogen, the nitro group and amine groups represented by the formula:

and ether groups, R—O—, wherein R, $m$ and $n$ have the respective meanings already set out herein.

Illustrative examples of the non-hydrocarbon groups include monohaloalkyl groups, usch as the chloromethyl and bromomethyl groups, the 2-chloroethyl, 1-bromopropyl, 3-chloropropyl and the like; polyhaloalkyl groups, such as the dichloromethyl, tribromomethyl, 1,2-dichloroethyl, 2,2-dibromoethyl, 3,3-dichloro-2-bromopropyl groups, and the like; nitroalkyl groups such as the 2-nitroethyl group; halo-substituted aromatic groups such as the various isomeric chloro- and bromophenyl groups, the various isomeric polyhalophenyl groups, such as the 2,6-dichlorophenyl group, the 3,5-dibromophenyl group and the like; amino-substituted groups, such as the 2-aminoethyl group, the 2-dimethylaminoethyl groups and the like; the aniline group; the p-dimethylaminophenyl group; the p-ethylaminobenzyl group and the like.

The symbol, R", may also represent a functional organic group, such as a carboaliphaticoxy group, particularly a carboalkoxy or an alkoxyalkyleneoxycarbonyl group of up to ten carbon atoms; it may represent an ether group, R—O—, wherein R has the meaning already set out; it may represent an acyloxyalkoxycarbonyl group wherein the acyl group is

or it may represent an amide group having the amino moiety set out above.

The preferred organic groups represented by the symbol R" are those having the formulae:

and

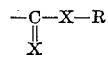

wherein X represents oxygen or sulfur and R has the meaning already set out herein.

Of particular interest because of their high insecticidal activity and tendency toward instability are the phosphates ($n=2$) of the foregoing generic formula wherein each R is lower hydrocarbon—particularly alkyl of up to seven carbon atoms, aryl of up to ten carbon atoms or aralkyl of up to ten carbon atoms, particularly the phenyl or benzyl group; R' bonded to the alpha carbon atoms is hydrogen or one of the groups represented by R, and (a) R' bonded to the beta carbon atom is middle halogen and R" is middle halogen;

(b) R' bonded to the beta carbon atom is hydrogen, middle halogen or one of the preferred groups represented by R, and R" is a group of the formula

wherein R is one of the preferred groups represented by R.

Of most importance from the standpoint of this invention are the dialkyl 2,2-dihalovinyl phosphates and the dialkyl 1-alkyl-2-carboalkoxyvinyl phosphates, having the respective formulae:

(a)

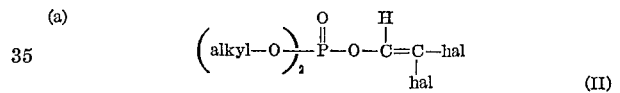
(II)

wherein alkyl represents an alkyl group of from one to four carbon atoms and hal represents middle halogen—i.e., bromine or chlorine;

(b)

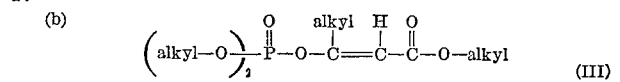
(III)

wherein alkyl represents alkyl of from one to four carbon atoms. Typical species of these insecticides include:

Dimethyl 2-carbomethoxy-1-methylvinyl phosphate
Dimethyl 2,2-dichlorovinyl phosphate
Dimethyl 2-benzyloxycarbonyl-1-methylvinyl phosphate
Dimethyl 2-phenyloxycarbonyl-1-methlvinyl phosphate
Dimethyl 2-(alpha-methylbenzyloxycarbonyl)-1-methlvinyl phosphate
2-carbomethoxy-1-methylvinyl methyl p-nitrophenyl phosphate
2-(2-acetoxyethoxycarbonyl)-1-methylvinyl dimethyl phosphate
2-(2-benzoyloxyethoxycarbonyl)-1-methylvinyl dimethyl phosphate
2-(2-methoxyethoxycarbonyl)-1-methylvinyl dimethyl phosphate
2-carbethoxy-1-methylvinyl ethyl 2-methoxyethyl phosphate
Methyl 2-carbethoxy-1-methylvinyl phenylphosphonate
Ethyl 2-methoxycarbonyl-1-methylvinyl dimethlaminophenylphosphonate
2-(2-carbethoxyvinyloxy)-4-methyl-2-oxy-1,3,2-dioxaphospholane
2-(m-nitrobenzyloxycarbonyl)-1-methylvinyl dimethyl phosphate
2-(p-nitrobenzyloxycarbonyl) 1-methylvinyl dimethyl phosphate
Dimethyl 1-methyl-2-(p-tolyloxycarbonyl) vinyl phosphate
Dimethyl 2-phenethyloxycarbonyl-1-methylvinyl phosphate 2-(p-methoxybenzyloxycarbonyl)-1-methylvinyl dimethyl phosphate
2-phenoxyethoxycarbonyl-1-methylvinyl dimethyl phosphate
2-(p-chlorophenoxycarbonyl)-1-methylvinyl dimethyl phosphate
2-(p-chlorobenzyloxycarbonyl)-1-methylvinyl dimethyl phosphate
Diethyl 2-carboethoxy-1-methylvinyl phosphate
Dimethyl 2-carbomethoxy-2-phenylvinyl phosphate
Diethyl 2-carboethoxy-1-cyclopenten-1-yl phosphate
Diethyl 2-carbethoxy-2-chlorovinyl phosphate
Diethyl 1-ethoxy-2-carbethoxy-2-chlorovinyl phosphate
2-chloro-2-carbethoxy-1-methylvinyl dimethyl phosphate
2-benzyloxycarbonyl-1-methylvinyl methyl phenyl phosphate
2-carbethoxyvinyl dimethyl phosphate
2-chlorovinyl dimethyl phosphate
O,O-diethyl O-(2-(ethylthio))-carbonyl-1-methylvinyl phosphorothioate
O-(p-chlorophenylsulfoxylethyl) O-ethyl O-1-methyl-2-carbethoxyvinyl phosphate
2-chloro-2-(methoxycarbonyl)-1-methylvinyl dimethyl phosphate
Diethyl 2-carbethoxy-1-cyclopentenyl-yl thionophosphate
2-chloro-2-acetyl-1-methylvinyl diethyl phosphate
2,2-dichlorovinyl di-sec-butyl phosphate
2,2-dichlorovinyl ethyl phenylphosphonate
2,2-dibromovinyl dimethyl phosphate
2,2-dichloro-1-phenylvinyl dimethyl phosphate
2-chloro-1-phenylvinyl diethyl phosphate
2-chloro-2-carbethoxy-1-methylvinyl diethyl phosphate
2,2-dichlorovinyl ethyl 1,2-dichloropropyl phosphate The dihaloethyl insecticides and fungicides contemplated by this invention are those insecticides corresponding to the Formula I wherein a mole of halogen has been added across the double bond of the vinyl group. Of particular interest because of their high insecticidal activity are the phosphates ($n=2$) and wherein the halogen which has been added is bromine, each R is lower hydrocarbon—particularly alkyl of up to seven carbon atoms, aryl of up to ten carbon atoms, or aralkyl of up to ten carbon atoms (the phenyl and benzyl groups being particularly preferred), R-bonded to the alpha carbon atom is hydrogen or one of the groups represented by R, R' bonded to the beta carbon atom is hydrogen or middle halogen and R'' is middle halogen. Of most importance of this subgenus are the dialkyl 1,2-dibromo-2-halo-ethyl phosphates and dialkyl 1,2-dibromo-2,2-dihaloethyl phosphates, having the formula:

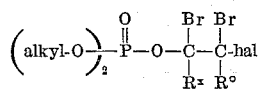

wherein alkyl represents an alkyl group of from one to four carbon atoms, hal represents middle halogen, preferably chlorine, $R^x$ represents hydrogen or alkyl of from one to four carbon atoms, and $R^\circ$ represents hydrogen or middle halogen, preferably chlorine. Most potent appear to be those wherein $R^x$ is hydrogen, hal is chlorine and $R^\circ$ is chlorine.

Of particular interest because of their high fungicidal activity are the phosphates ($n=2$) of the foregoing generic formula wherein each hal is bromine, each R is lower hydrocarbon—particularly alkyl of up to seven carbon atoms, aryl of up to ten carbon atoms, or aralkyl of up to ten carbon atoms (the phenyl and benzyl groups being particularly preferred), R' bonded to the alpha carbon is hydrogen or one of the groups represented by R, R' bonded to the beta carbon atom is hydrogen or halogen and R'' represents the group

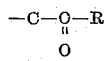

Of most importance of this subgenus are the dialkyl 1,2-dibromo-2-carboalkoxyethyl phosphates, having the formula:

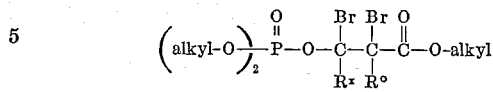

wherein alkyl represents an alkyl group of from one to four carbon atoms, $R^x$ represents hydrogen, or alkyl of from one to four carbon atoms, and $R^\circ$ represents hydrogen or middle halogen, preferably chlorine. Typical species of these pesticides include:

Dimethyl 1,2-dibromo-2-carbomethoxy-1-methylethyl phosphate
Dimethyl 1,2-dibromo-2,2-dichloroethyl phosphate
Dimethyl 1,2-dibromo-2-benzyloxycarbonyl-1-methylethyl phosphate
Dimethyl 1,2-dichloro-2-phenyloxycarbonyl-1-methylethyl phosphate
Dimethyl 1,2-dibromo-2-(alpha-methylbenzyloxycarbonyl)-1-methylvinyl phosphate
1,2-dibromo-2-carbomethoxy-1-methylethyl methyl p-nitrophenyl phosphate
1,2-dibromo-2-(2-acetoxyethoxycarbonyl)-1-methylethyl dimethyl phosphate
1,2-dibromo-2-(2-benzoyloxyethoxycarbonyl)ethyl dimethyl phosphate
1,2-dibromo-2-(2-methoxyethoxycarbonyl)-1-methylvinyl dimethyl phosphate
1,2-dibromo-2-carbethoxy-1-methylethyl ethyl 2-methoxyethyl phosphate
Methyl 1,2-dibromo-2-carbethoxy-1-methylethyl phenylphosphonate
Ethyl 1,2-dibromo-2-methoxycarbonyl-1-methylethyl dimethylaminophenylphosphonate
2-(1,2-dibromo-2-carbethoxyethyloxy)-4-methyl-2-oxy-1,3,2-dioxaphospholane
1,2-dibromo-2-(m-nitrobenzyloxycarbonyl)-1-methylethyl dimethyl phosphate
1,2-dibromo-2-(p-nitrobenzyloxycarbonyl)-1-methylethyl dimethyl phosphate
Dimethyl 1,2-dibromo-1-methyl-2-(p-tolyloxycarbonyl)-ethyl phosphate
Dimethyl 1,2-dibromo-2-phenethyloxycarbonylethyl phosphate
1,2-dibromo-2-(p-methoxybenzyloxycarbonyl)-1-methylethyl dimethyl phosphate
1,2-dibromo-2-chloro-2-phenoxyethoxycarbonylethyl dimethyl phosphate
1,2-dibromo-2-(p-chlorobenzyloxycarbonyl)-1-methylethyl dimethyl phosphate
Diethyl 1,2-dibromo-2-carboethoxy-1-methylethyl phosphate
Dimethyl 1,2-dibromo-2-carbomethoxy-2-phenylethyl phosphate
Diethyl 1,2-dibromo-2-carboethoxy-1-cyclopentyl phosphate
Diethyl 1,2-dibromo-2-chloro-1-ethoxy-2-carbethoxyethyl phosphate
Diethyl 1,2-dibromo-2-carbethoxy-1-chloroethyl phosphate
1,2-dibromo-2-chloro-2-carbethoxy-1-methylethyl dimethyl phosphate
Dimethyl 1,2-dibromo-2-chloro-2-carbomethoxy-1-methylethyl phosphate
Dimethyl 1,2-dibromo-2-(N,N-diethylcarbamoyl)-1-methylethyl phosphate
Dimethyl 1,2-dibromo-2-chloroethyl phosphate
Dimethyl 1,2,2-tribromoethyl phosphate
Dimethyl 1,2-dichloro-2-bromoethyl phosphate
1,2-dibromo-2-benzyloxycarbonyl-1-methylethyl methyl phenyl phosphate
1,2-dibromo-2-carbethoxyethyl dimethyl phosphate
1,2,2-trichloroethyl dimethyl phosphate O,O-diethyl O-(1,2-dibromo-2-(ethylthio))-carbonyl-1-methylethyl phosphorothioate
O-(p-chlorophenylsulfoxyethyl) O-ethyl O-1-methyl-1,2-dibromo-2-carbethoxyethyl phosphate
1,2-dibromo-2-chloro-2-(methoxycarbonyl)-1-methylethyl dimethyl phosphate
Diethyl 1,2-dibromo-2-carbethoxy-1-cyclopentyl thionophosphate
1,2-dibromo-2-chloro-2-acetyl-1-methylethyl diethyl phosphate
1,2-dibromo-2,2-dichloroethyl di-sec-butyl phosphate
1,2-dibromo-2,2-dichloroethyl ethyl phenylphosphonate
1,2,2,2-tetrabromoethyl dimethyl phosphate
1,2-dibromo-2,2-dichloro-1-phenylethyl dimethyl phosphate
1,2-dibromo-2-chloro-1-phenylethyl diethyl phosphate
1,2-dibromo-2-chloro-2-carbethoxy-1-methylethyl diethyl phosphate
1,2-dibromo-2,2-dichloroethyl ethyl 1,2-dichloropropyl phosphate
Dimethyl 1,2-dibromo-2-benzyloxycarbonyl-1-methylethyl phosphate These pesticides are most conveniently prepared by halogenating the known corresponding enol esters of acids of pentavalent phosphorus, which enol esters have the formula:

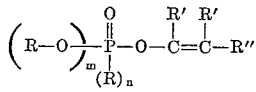

wherein the various symbols have the respective meanings already set out herein.

This class of enol esters is well known in the art, various subclasses thereof being described in such United States patents as U.S. 2,685,552; U.S. 2,744,128; U.S. 2,765,331; U.S. 2,788,358; U.S. 2,802,855; U.S. 2,865,943; U.S. 2,865,944; US. 2,867,646; U.S. 2,891,887; U.S. 2,894,014; U.S. 2,894,018; U.S. 2,895,982; U.S. 2,898,341; U.S. 2,908,605; U.S. 2,913,367, and U.S. 2,956,073, and in such British patents as No. 783,697.

The preparation of a particular species of these pesticides is shown in U.S. Patent No. 2,971,882. The preparation of other species is shown in copending applications, Serial Nos. 30,757, now Patent No. 3,005,841, and 30,776, now Patent No. 3,081,220, both filed May 23, 1960.

Halogenation of these enol esters is generally most effectively accomplished by contacting the ester with free halogen, a suitable solvent being used if necessary to moderate the reaction. The addition of the halogen should be conducted at a rather low temperature to avoid decomposition of the phosphorus-containing reactant and/or the phosphorus-containing product. Thus, during addition of the halogen, the reaction mixture temperature should be kept below about 40° C. After addition of the halogen is complete, the reaction mixture may be warmed to a somewhat higher temperature—preferably not exceeding about 60° C.—to insure completion of the halogenation. In many cases, it may be found best to maintain the reaction at a low temperature—say, in the range of from about —5° C. to about 30° C.—during addition of the halogen, then warm the mixture to a higher temperature to insure complete reaction. A particularly suitable solvent in most cases is methylene dichloride. Actinic radiation, for example, ultraviolet light, may be used to promote the addition of the halogen.

The product is generally most easily worked up by distillation techniques. In many cases, it will be found that little or no side reactions occur, so that a sufficiently pure product will be obtained by simply stripping the solvent from the final reaction mixture, preferably using sub-atmospheric pressure as necessary to avoid thermal decomposition of the product. If a pure product is required, it can be obtained by extraction, distillation or other known means for purifying organo-phosphorus compounds.

Since the halogen reacts substantially only with the olefinic double bond of the ester reactant, in many cases, to obtain a pure product it is necessary only to add the stoichiometric amount of halogen. Alternatively, the course of the reaction may be checked, by means of infrared spectrum analysis, for example, to determine when all of the olefinic double bonds of the ester reactants have been reacted with halogen.

Should some of the ester reactant remain in the final mixture, it may be allowed to remain therein, since it will not affect the pesticidal activity of the halogenated product, but will be present merely as an inert diluent. Of course, where the ester reactant is a good pesticide, some of it may be allowed in the product to provide that product with additional pesticidal activity.

Those emulsifiers which have been found to be most compatible with, and to have the least effect upon, the pesticides contemplated by this invention, are the water-soluble, nonionic surface-active agents. Such materials are defined and described in Schwartz and Perry, "Surface Active Agents and Detergents," Interscience (1958), volume 2. These are materials in which the hydrophilic groups involve ether oxygen (—O—) linkages, one or more hydroxyl groups, and other groups containing oxygen, as in carboxylic acid ester groups, or non-basic nitrogen, as in amides containing the group —C(O)NH—.

Suitable classes of these nonionic surface-active agents include:

(1) Natural products, primarily the saponins such as Fomagen®;

(2) Condensation products of fatty substances and their derivatives with ethylene and/or propylene oxides, such as the ethylene oxide condensates with acids such as fatty acids, with alcohols, and with esters. These in general are polyoxyethers—e.g., the polyethenoxy ethers. Included are the condensates of ethylene oxide or propylene oxide with such materials are carboxylic acids, such as tall oil acids, fatty acids of oxidized paraffin wax, rosin acids, dimerized linoleic acid, alklated benzoic acids, naphthenic acids, alkylcyclohexenecarboxylic acids and the like. The corresponding esters also are suitable. Also included are the condensate of ethylene oxide or propylene oxide with alcohols, such as fatty alcohols, including oleyl alcohol, stearyl alcohol and the like. Also included are the condensates of ethylene oxide or propylene oxide with vegetable oils, and like materials. Typical materials of this type include those sold under the trade names Peregal O, Tergitol, Emulphor ON–870, Emulphor VN–430, Advawet 10, Agrimul 20A, Ahcowet N, Ahcowet VL, Algepon LN, Alkanol HCS, "All," Alrowax 95, Apexomine 251, Aquet, Atconil O, Atlas E–2079, G–2162, G–39W; Atlux series, Brij, Burkester, Carboxine TW, LD; Cerfak 1400, 1422; Conco NI–300, Pergon MF, Diaopon AN, Dispersant NI–4, Dispersol V, Emulphogenes, Emulsans, Energetics, Eumulgins, Facids, Kleneg, Morosol 3F, Myrj series, Nalco L–357, Nopalco, Peg 42, Pluronics, Poly Tergent J and LF series, Pronon 505–531, Penex series, Siponic series, Synthrapol series, Synthetics series, Surfonic TD series, Sterox A series, Solulan series and the like.

(3) Condensation products of ethylene oxide and/or propylene oxide with phenolic materials, such as dodecylphenol, $C_6$–$C_8$-alkylated beta-naphthol, diamylphenol, p-tert-octylphenol and nonyl-phenyl. These, too, are generally polyoxyethers. Typical materials of this type include those sold under the trade names Afrox, Alloscour R, Arctic Syntex 036, Atcopal D, Carboxane-NW, Canco NI–100, Dispersant NI–O, NI–W; DME, DMS, Druterge ON, Hyonic PE series, Igepals, Intexons, Lissapol H, NX; Lubrols, Nalco L–710, Neutronyx 600–675, Nonic 300, Nonionic E series, Poly Tergent B and G series, Pronon 201–280, Sterox D and N series, Surfonic N series, and the like.

(4) Esters of fatty acids and glycerols, including polyalkylene glycols, such as those sold under the trade names Advawet 33, Aldo, Alrodyne 315, 8020; Arlacel 161, Atlas G-1556, -1559, Bemul, Ecconol 70, Emcol 14, Empilan AP-100, CQ-100; Emulsynts, Ethofats, Ethoxanol, Hodags, Modicol L, Nalco L-1117, Neutronyx 268-333, Mionine Ban, NNO; Nonisol series, Peglo series, Promul series, Trem series, Triton B-1956, X-100, other Tritons.

(5) Esters of fatty acids and polyols of the general type: $(OH)_nA—(OC_2H_4)_xH$, such as the Tweens (trade name) in which the polyol is a mixture of anhydrosorbitols, and the Spans (trade name), Arlacels 20-85, Arlacel C, Atlas G-672, G-1086; Atpet, Glycomuls, Morosol SL.

(6) Nitrogen-containing materials, such as the Ethomids (fatty amides with two polyoxyethylene chains as substituents on the nitrogen atoms), and Ethomeens (long-chain amines with two polyoxyethylene chains on the nitrogen), also Alkamine C, Alkamine W-30, Alrosol B, C, O, S; Alrosperse HP, Amidox, Aminol, Artarox G-100, Apexomide, Atlasene 500-C, Ecconol 66, Pianol EN, DHL 95, Condensate M, PF; Lonco K, Comperlans, Cerfak N-100, Cardene, Carboxane G-3, Atco X-500, Atco DA, Emcol 5130, Emkagens, Empilan AL, Intexides, Leyco 229, Modicol N, Monamids, Monamines, Moropon AS-3, Ninols, Onxy-ol 12-345, Pepcol series, Polytex 10, Prosol series, Tesapon.

(7) Condensation products of alkylene oxides and thiols, such as the thioether made by reacting n-dodecylmercaptan with ethylene oxide including, by trade name, Certak 1300, Nonic 218 and 260, Penetract 100, Sterox SK.

(8) Reaction products of higher alkyl diacid phosphates with ethylene oxide or with polyglycols to form mixed esters, such as the Victamuls and Victowets.

(9) Polyhydroxy materials, such as the fatty acid monoesters of di- and polysaccharides such as sucros or dextrin, casein and derivatives of glucose such as are sold under the trade names Aquasperse 30, Centrolene N, NS, C; Clearates.

(10) Phosphatides, such as those sold under the trade name Alcolec.

As will be evident, the foregoing is but a brief outline of the types of suitable nonionic surface-active agents. More complete description of these surface-active agents is set out at pages 202-213 of Perry and Schwartz (supra) and at pages 120-134 of Perry, Schwartz and Berch (supra). The chemical nature of the materials identified by trade name is set out in McCutcheon, Detergents and Emulsifiers, 1960 edition.

Preferred are the polyoxyethylated vegetable oils and the alkylphenoxypoly(ethyleneoxy)ethanols.

The suitable epoxyhaloalkanes are those which have a vic-epoxy, or oxirane group, and a halogen atom both joined to the carbon atom of an alkane group. In terms of formula, these compounds are represented as follows:

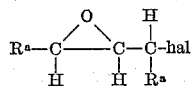

wherein "hal" represents halogen, preferably middle halogen (i.e., bromine or chlorine), and each $R^a$ represents hydrogen or alkyl of from one to six carbon atoms. Examples of these compounds include, among others, epichlorohydrin, epibromohydrin, 1-chloro-2,3-epoxy-butane, 1-chloro-2,3-epoxyhexane, 1 - chloro-2,3-epoxy-4-methylpentane, 3-chloro-4,5-epoxyoctane, 1 - chloro-2,3-epoxyhexane, 1 - bromo-2,3-epoxyhexane, and the like. Preferred because of their ready availability are the epihalohydrins (all of $R^a$ are hydrogen), with epichlorohydrin being particularly preferred because of its relatively low cost.

Only a minor amount of the epoxyhaloalkane need be used. Thus, the amount of the epoxyhaloalkane used can be as little as 0.1 percent of the weight of the combined weights of the pesticide and the solvent used, while in some cases as much as 2 percent of the combined weights of the pesticide and the solvent of the epoxyhaloalkane will be required. Ordinarily, about 0.5 percent to about 1 percent of the epoxyhaloalkane, on the same basis, is sufficient.

Aside from the choice of surface-active agent and/or inclusion of the epoxyhaloalkane, the emulsifiable concentrates of this invention are compounded and used by techniques well known and generally practiced by the art.

The usual solvents are suitable; generally, these are hydrocarbon materials. Suitable liquid hydrocarbon materials include the nonphytotoxic hydrocarbon fractions such as kerosenes, light mineral oil distillates of intermediate viscosity and volatility, and the like. Aromatic solvents are suitable, such solvents as toluene, the xylenes (including commercially available technical products) and the like. The concentration of the pesticide in the solvent generally lies within the range of from about 10 percent by weight to about 75 percent by weight of the mixture of pesticide and solvent.

The concentrates can include materials other than the pesticide, the solvent, the surface-active agent and the epoxyhaloalkane. Thus, such materials as stickers, extenders (such as "film-formers" typified by the chlorinated polyphenyls sold under the trade name, Aroclor), fertilizers, other pesticides, hormones and in the case of the fungicides, soil conditioners, nematicides, soil amenders, and other materials can be added. Where the fungicides are to be used for non-agricultural purposes, phytotoxic materials can be included, as for example, the inclusion of copper salts when the fungicidal composition is to be used in preserving book bindings, or in protecting sills and pilings. For example, other insecticides which can be included in the formulation are pyrethrum, rotenone, sabadilla, and like naturally-occurring insecticides, as well as synthetic insecticides such as DDT, benzene hexachloride, thiodiphenylamine, cyanides, tetraethyl pyrophosphate, dimethyl-p-nitrophenyl thiophosphate, lindane, azobenzene, and the various compounds of arsenic, lead and/or fluorine. Suitable fertilizers would include ammonium sulfate, urea, ammonium phosphate, potassium nitrate and the like.

The following data exemplifies practice of this invention and illustrates the benefits to be derived therefrom: (in the following example, the insecticide designated by the trade name "Vapona Insecticide" is dimethyl 2,2-dichlorovinyl phosphate, and the insecticide designated by the trade name "Dibrom" is 1,2-dibromo-2,2-dichloroethyl dimethyl phosphate). Experience has shown that storage at 130° F. for one month or 100° F. for three months is equivalent to more than one year's storage at room temperature.

In a first series of experiments, the effect of various emulsifier types and of epichlorohydrin, a typical epoxyhaloalkane, on the stability of Vapona Insecticide in typical emulsible concentrates was investigated. The nature of the compositions, the emulsifiers, etc., and the results of the tests, are set forth in Table I.

In a second series of experiments, the effect of water on the stability of Vapona Insecticide in typical emulsible concentrates was investigated, the results being set forth in Table II.

Tables III through IX set forth the results of tests performed to determine the effect of epichlorohydrin on the stability of Vapona Insecticide and Dibrom, respectively, in typical emulsible concentrates.

The results obtained from these experiments demonstrate the benefit obtained by practice of this invention:

Table I shows, comparing sample 5 with samples 1 and 3, the increase in toxicant stability resulting from the use of nonionic, rather than anionic, surface-active agents. This is also shown by comparing the results in Tables V-VII with the results in Tables III and IV.

Table I also shows, comparing samples 2 and 4 with samples 1 and 3, the advantages obtained by inclusion of epichlorohydrin, even when the surface-active agent is one which is anionic. Sample 6 shows the marked advantages obtained through use of a nonionic surface-active agent and inclusion of epichlorohydrin.

Table II shows the advantages obtained through the use of epichlorohydrin in stabilizing the toxicant against the effects of water.

Tables III through IX further demonstrate the advantages accruing through inclusion of epichlorohydrin.

TABLE I

| Sample No. | 1 | 2 | 3 | 4 | 5 | 6 |
|---|---|---|---|---|---|---|
| Ingredient, percent: | | | | | | |
| Vapona® Insecticide | 46.9 | 46.9 | 24.8 | 24.8 | 45.1 | 45.1 |
| Heavy aromatic naphtha | | | 70.2 | 69.2 | | |
| Xylene | 43.1 | 42.1 | | | 44.9 | 43.9 |
| Blended anionic/nonionic surfactant [a] | 10.0 | 10.0 | | | | |
| Do [b] | | | 5.0 | 5.0 | | |
| Nonionic surfactant [c] | | | | | 10.0 | 10.0 |
| Epichlorohydrin | | 1.0 | | 1.0 | | 1.0 |
| Percent toxicant loss during storage of samples for one month at 130° F. in glass | 18.9 | 9.7 | 11.1 | 6.1 | 5.7 | 0.8 |

[a] Emcol H500X—blended polyoxyethylene ethers and oil soluble sulfonates.
[b] Agrimul N4R—aromatic sulfonate-ethylene oxide condensate blend.
[c] Igepal DM 710—anhydrous alkyl phenoxypolyoxyethylene ethanol.

TABLE II

| Sample No. | 7 | 8 | 9 | 10 | 11 | 12 |
|---|---|---|---|---|---|---|
| Ingredients, percent w.: | | | | | | |
| Vapona® Insecticide | 24.8 | 24.8 | 24.8 | 46.9 | 46.9 | 46.9 |
| Heavy aromatic naphtha | 70.2 | 70.2 | 69.2 | | | |
| Xylene | | | | 43.1 | 43.1 | 42.1 |
| Agrimul N4R | 5.0 | 5.0 | 5.0 | | | |
| Emcol H500X | | | | 10.0 | 10.0 | 10.0 |
| Epichlorohydrin | | | 1.0 | | | 1.0 |
| Total | 100.0 | 100.0 | 100.0 | 100.0 | 100.0 | 100.0 |
| Water content of formulation, percent w. | 0.2 | 0.08 | 0.08 | 0.62 | 0.19 | 0.19 |
| Percent toxicant loss during storage of samples for one month at 130° F. in glass | 24.3 | 11.1 | 6.2 | 27.3 | 18.8 | 8.7 |

TABLE III

*Effect of Epichlorohydrin on the Toxicant Stability of an Emulsible Concentrate Containing Four Pounds of Vapona® Insecticide Per Gallon*

| Sample 13 | | Sample 14 | |
|---|---|---|---|
| Ingredient | Percent w. | Ingredient | Percent w. |
| Vapona® Insecticide | 46.9 | Vapona® Insecticide | 46.9 |
| Xylene | 43.1 | Xylene | 42.1 |
| Emcol H 500X [a] | 10.0 | Emcol H 500X [a] | 10.0 |
| | | Epichlorohydrin | 1.0 |
| Total | 100.0 | Total | 100.0 |

| Percent Toxicant Loss | Sample 13 | Sample 14 |
|---|---|---|
| During storage of samples for one month at room temperature in glass | 9.1 | 0.9 |
| During storage of samples for one month at 130° F. in glass | 18.9 | 9.7 |

[a] A blend of polyoxyethylene ethers and oil soluble sulfonates.

TABLE IV

*Effect of Epichlorohydrin on the Toxicant Stability of an Emulsible Concentrate Containing Two Pounds of Vapona® Insecticide Per Gallon*

| Sample 15 | | Sample 16 | |
|---|---|---|---|
| Ingredient | Percent w. | Ingredient | Percent w. |
| Vapona® Insecticide | 24.8 | Vapona® Insecticide | 24.8 |
| Heavy aromatic naphtha | 70.2 | Heavy aromatic naphtha | 69.2 |
| Agrimul N4R [a] | 5.0 | Agrimul N4R [a] | 5.0 |
| | | Epichlorohydrin | 1.0 |
| Total | 100.0 | Total | 100.0 |

| Percent Toxicant Loss | Sample 15 | Sample 16 |
|---|---|---|
| During storage of samples for one month at room temperature in glass | 4.0 | 0.5 |
| During storage of samples for one month at 130° F. in glass | 11.1 | 6.1 |

[a] Aromatic sulfonate-oxide condensate blend.

TABLE V

*Effect of Epichlorohydrin on the Toxicant Stability of an Emulsible Concentrate Containing Four Pounds of Vapon® Insecticide Per Gallon*

| Sample 17 | | Sample 18 | |
|---|---|---|---|
| Ingredient | Percent w. | Ingredient | Percent w. |
| Vapona® Insecticide | 43.5 | Vapona® Insecticide | 43.5 |
| Heavy aromatic naphtha | 46.5 | Heavy aromatic naphtha | 45.5 |
| Emulphor EL-620 [a] | 10.0 | Emulphor EL-620 [a] | 10.0 |
| | | Epichlorohydrin | 1.0 |
| Total | 100.0 | Total | 100.0 |

| Percent Toxicant Loss | Sample 17 | Sample 18 |
|---|---|---|
| During storage of samples for two weeks at 130° F. in glass | 7.2 | 1.4 |
| During storage of samples for one month at 130° F. in glass | 8.8 | 6.2 |
| During storage of samples for three months at 100° F. in glass | 3.4 | 1.2 |

[a] Anhydrous polyoxyethylated vegetable oil.

TABLE VI

*Effect of Epichlorohydrin on the Toxicant Stability of an Emulsible Concentrate Containing Four Pounds of Vapon® Insecticide Per Gallon*

| Sample 19 | | Sample 20 | |
|---|---|---|---|
| Ingredient | Percent w. | Ingredient | Percent w. |
| Vapona® Insecticide | 45.1 | Vapona® Insecticide | 45.1 |
| Xylene | 44.9 | Xylene | 43.9 |
| Igepal DM-710 [a] | 10.0 | Igepal DM-710 [a] | 10.0 |
| | | Epichlorohydrin | 1.0 |
| Total | 100.0 | Total | 100.0 |

| Percent Toxicant Loss | Sample 19 | Sample 20 |
|---|---|---|
| During storage of samples for two weeks at 130° F. in glass | 5.1 | 0.5 |
| During storage of samples for one month at 130° F. in glass | 5.7 | 0.8 |

[a] Anhydrous alkyl phenoxy polyoxyethylene ethanol.

TABLE VII

*Effect of Epichlorohydrin on the Toxicant Stability of an Emulsible Concentrate Containing Two Pounds of Vapona® Insecticide per Gallon*

| Sample 21 | | Sample 22 | |
|---|---|---|---|
| Ingredient | Percent w. | Ingredient | Percent w. |
| Vapona® Insecticide | 25.0 | Vapona® Insecticide | 25.0 |
| Xylene | 65.0 | Xylene | 64.0 |
| Igepal DM-710 [a] | 10.0 | Igepal DM-710 [a] | 10.0 |
|  |  | Epichlorohydrin | 1.0 |
| Total | 100.0 | Total | 100.0 |

| Percent Toxicant Loss | Sample 21 | Sample 22 |
|---|---|---|
| During storage of samples for two weeks at 130° F. in glass | 4.6 | 0.4 |
| During storage of samples for one month at 130° F. in glass | 6.3 | 0.5 |

[a] Anhydrous alkyl phenoxy polyoxyethylene ethanol.

TABLE VIII

*Effect of Epichlorohydrin on the Toxicant Stability of an Emulsible Concentrate Containing One Pound of Vapona® Insecticide per Gallon*

| Sample 23 | | Sample 24 | |
|---|---|---|---|
| Ingredient | Percent w. | Ingredient | Percent w. |
| Vapona® Insecticide | 10.2 | Vapona® Insecticide | 10.2 |
| Aroclor 5460 [a] | 40.6 | Aroclor 5460 [a] | 40.6 |
| Xylene | 34.2 | Xylene | 33.2 |
| Witco T-60 [b] | 15.0 | Witco T-60 [b] | 15.0 |
|  |  | Epichlorohydrin | 1.0 |
| Total | 100.0 | Total | 100.0 |

| Percent Toxicant Loss | Sample 23 | Sample 24 |
|---|---|---|
| During storage of samples for two weeks at 130° F. in glass | 9.5 | 4.1 |
| During storage of samples for one month at 130° F. in glass | 18.4 | 6.3 |

[a] Chlorinated polyphenyl mixture.
[b] Polyether.

TABLE IX

*Effect of Epichlorohydrin on the Toxicant Stability of an Emulsible Concentrate Containing Eight Pounds of Dibrom (SD-6095) per Gallon*

| Sample 25 | | Sample 26 | |
|---|---|---|---|
| Ingredient | Percent w. | Ingredient | Percent w. |
| Dibrom (SD-6095) | 66.2 | Dibrom (SD-6095) | 66.2 |
| Heavy aromatic naphtha | 18.8 | Heavy aromatic naphtha | 17.8 |
| Emulphor EL-620 [a] | 15.0 | Emulphor EL-620 [a] | 15.0 |
|  |  | Epichlorohydrin | 1.0 |
| Total | 100.0 | Total | 100.0 |

| Percent Toxicant Loss | Sample 25 | Sample 26 |
|---|---|---|
| During storage of samples for two weeks at 130° F. in glass | 14.3 | 7.9 |
| During storage of sample for three months at 100° F. in glass | 15.1 | 8.1 |

[a] Anhydrous poloxyethylated vegetable oil.

We claim as our invention:

1. A stable insecticidal composition comprising in intimate admixture:
   (a) a vinyl phosphate insecticide of the formula:

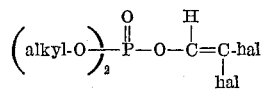

wherein "alkyl" represents an alkyl group of from one to four carbon atoms, and "hal" represents a member of the group consisting of chloride and bromine;
   (b) an inert liquid horticultural carrier;
   (c) a nonionic surface-active agent;
   (d) a minor, stabilizing amount of a lower epoxyhaloalkane of the formula

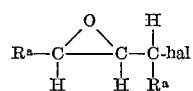

wherein "hal" represents a member of the group consisting of chlorine and bromine and $R^a$ represents a member of the group consisting of hydrogen and alkyl groups of from 1 to 6 carbon atoms.

2. A composition according to claim 1 wherein the epoxyhaloalkane is an epihalohydrin.
3. A composition according to claim 2 wherein the epihalohydrin is epichlorohydrin.
4. A composition according to claim 3 wherein the insecticide is dimethyl 2,2-dichlorovinyl phosphate.
5. A stable pesticidal composition comprising an intimate admixture:
   (a) a phosphate pesticide of the formula:

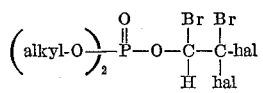

wherein "alkyl" represents an alkyl group of from one to four carbon atoms, and "hal" represents a member of the group consisting of chloride and bromine;
   (b) an inert liquid horticultural carrier;
   (c) a nonionic surface-active agent;
   (d) a minor, stabilizing amount of a lower epoxyhaloalkane of the formula

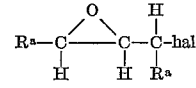

wherein "hal" represents a member of the group consisting of chlorine and bromine and $R^a$ represents a member of the group consisting of hydrogen and alkyl groups of from 1 to 6 carbon atoms.

6. A composition according to claim 5 wherein the epoxyhaloalkane is an epihalohydrin.
7. A composition according to claim 6 wherein the epihalohydrin is epichlorohydrin.
8. A composition according to claim 7 wherein the pesticide is dimethyl 2,3-dibromo-2,2-dichloroethyl phosphate.

References Cited in the file of this patent

UNITED STATES PATENTS

| 2,166,604 | Meyer | July 18, 1939 |
| 2,545,186 | Yates et al. | Mar. 13, 1951 |
| 2,956,920 | Perkow | Oct. 18, 1960 |

FOREIGN PATENTS

| 153,222 | Australia | Sept. 21, 1950 |
| 690,585 | Great Britain | Apr. 22, 1953 |

OTHER REFERENCES

Chemical Abstracts, vol. 15, page 884 (1921), and vol. 17, page 264 (1923).